July 13, 1965    C. B. HACKNEY ET AL    3,194,993
ENCAPSULATED DYNAMOELECTRIC MACHINES
Filed Oct. 3, 1960
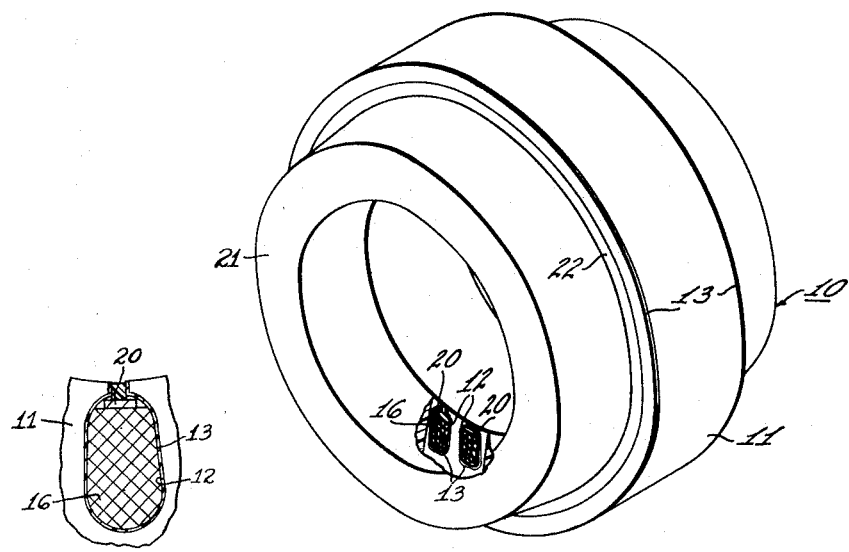
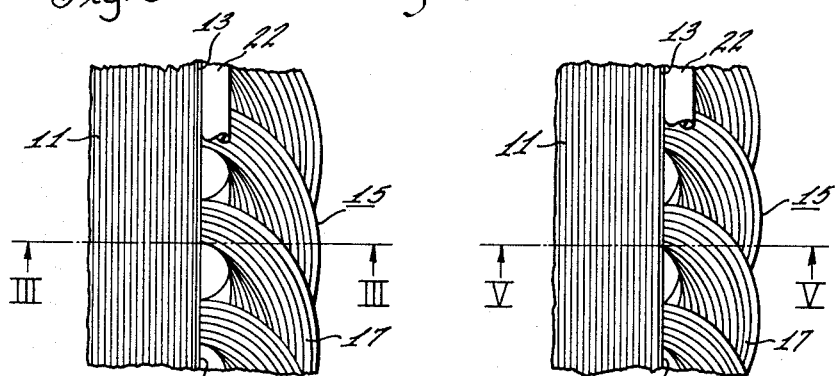
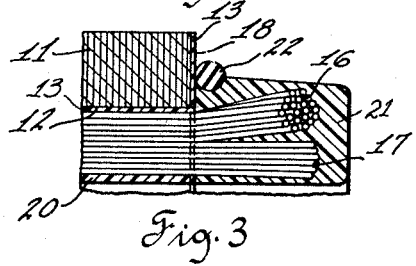
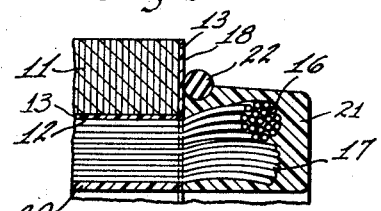
Inventors
Carl B. Hackney
Vernon B. Honsinger
by Robert C. Benson
Attorney

United States Patent Office 3,194,993
Patented July 13, 1965

3,194,993
ENCAPSULATED DYNAMOELECTRIC MACHINES
Carl B. Hackney, Bethel, and Vernon B. Honsinger, Cincinnati, Ohio, assignors to Allis-Chalmers Manufacturing Company, Milwaukee, Wis.
Filed Oct. 3, 1960, Ser. No. 60,183
1 Claim. (Cl. 310—43)

This application relates generally to electric motors. More specifically this application relates to an improved coating of the cores of motors which makes it possible to use shorter windings in the core.

In the electric motor industry there is a continual effort to reduce the size of the motors for a given horsepower output. This, of course, reduces the amount of material required in the machine thereby making it less expensive to build. Furthermore, the reduced size and weight makes it much more convenient to handle the motors and allow them to be put into installations where it was impossible to place them before. The reduction of size is especially important in encapsulated motors wherein the entire stator winding is encapsulated in a suitable material such as an epoxy resin.

In prior art motors, slot cells or liners are utilized to insulate the coil winding from the stator core. These slot cells extend between ¼ and ½ of an inch beyond the end of the stator core. The winding extends beyond the end of the slot cell before starting to make a loop. This accounts for the rather long extension of the stator winding beyond the end of the stator core. The slot cell is extended beyond the end of the core to prevent a short circuit between the coil and the core.

This invention provides a shorter motor by applying a coating of superior insulation on the stator core. The coating eliminates the need for slot cell insulation thereby permitting the loop of the end turns to be started closer to the edge of the core. Therefore, the length of the winding and consequently the length of the motor is reduced ½ to one inch. Naturally, this represents a large saving in material, especially on small motors. Furthermore, since the end of the stator core is also coated with a superior insulating material the end turns can be bent or compressed closer to the side of the core. This further reduces the overall length of the motor and in cases of encapsulated motors reduces the amount of encapsulating material.

Therefore, it is the object of this invention to provide a new and improved dynamoelectric machine.

Another object of this invention is to provide a new and improved core member for a dynamoelectric machine.

Another object of this invention is to provide a new and improved insulation for a member of a dynamoelectric machine.

Another object of this invention is to provide a new and improved method of making a member for a dynamoelectric machine.

Another object of this invention is to provide a dynamoelectric machine that has a shorter overall length than comparable prior art dynamoelectric machines.

Another object of this invention is to provide a new and improved dynamoelectric machine having better efficiency than similar prior art machines.

Another object of this invention is to provide a new and improved dynamoelectric machine with lower temperature rise than similar prior art machines.

Other objects and advantages of this invention will be apparent from the following description when read in connection with the accompanying drawings, in which:

FIG. 1 is a pictorial view partially in section of the stator of a dynamoelectric machine;

FIG. 2 is an enlarged plan view of an end portion of the dynamoelectric machine shown in FIG. 1 with the encapsulating material removed;

FIG. 3 is a cross sectional view taken along the line III—III of FIG. 2;

FIG. 4 is an enlarged plan view of the end portion of another embodiment of a dynamoelectric machine of this invention in which the end turns have been compressed and the encapsulating material has been removed;

FIG. 5 is a cross section view taken along the lines V—V of FIG. 4; and

FIG. 6 is an enlarged end view of a winding slot shown in FIG. 1.

As shown in the drawings, this invention is illustrated in a stator 10 for a dynamoelectric machine comprising a core 11 having a plurality of arcuately spaced, winding slots 12 around its periphery. The core 11 is made up in the usual manner of a group of iron laminations and the entire core structure is coated with a suitable thermoreactive material having good electrical insulating characteristics. Such a material is illustrated at 13. Specifically, the core is preferably coated with a thermoplastic or thermosetting material and by the fluidized bed method such as disclosed in United States Patent 2,844,489. It is particularly important that all of the wall surfaces defining the slots in the core and the ends of the core are entirely covered by the thermoreactive electrical insulating material 13.

Stator windings 15 consisting of coils of copper wires 16 are placed in the coated winding slot 12 in the usual manner except that the slot liner is eliminated and the end turns 17 are formed at the edge 18 of the stator core 11 rather than at a point spaced from the edge of the stator core. This, of course, places the windings in direct contact with the coated slot walls 14 and permits the end turns 17 to be formed in a much shorter distance than if they had to be spaced from the core as was done in the prior art. Since the length of the windings is reduced there is a corresponding increase in efficiency due to decreased copper loss and increased power factor. Furthermore, the removal of the slot liner, which is a relatively poor heat conductor, greatly facilitates the cooling of the motor. Even when the motor is encapsulated the cooling rate is increased because the air pockets that normally form around the slot liner are eliminated. As is well-known, air pockets in the motor insulation retard heat transfer and cause the motor to heat up.

In the motor shown in the drawings a top stick 20 is positioned in the winding slots 12 to help in preventing the wires of the stator winding from popping out of the slot cells. However, such a top stick is not required in all motors utilizing this invention especially those having encapsulated stator windings.

In the embodiment illustrated in FIGS. 4 and 5, the end turns 17 are compressed toward the sides of the stator core 11. This is done to further shorten the overall length of the stator. This particular construction is especially useful in connection with totally encapsulated motors wherein the entire stator coil is embedded in a thermoplastic or thermosetting material such as epoxy resin.

In both of the illustrated embodiments of the invention, the stator coils are encapsulated in a thermoreactive material 21. However, it is obvious that this invention is applicable to motors in which the stator is not encapsulated as well as to the illustrated encapsulated stator.

When encapsulating the stator an O-ring 22 or other similar resilient sealing material is positioned around the core at the edge of the mold. The O-ring is positioned radially outward of the coils and serves as a seal to prevent the liquid or powdered epoxy from leaking from the mold during the curing process. Furthermore, in the finished motor the O-ring provides a resilient cushion between the core and the epoxy. Experiments have shown that this structure has eliminated to a great degree the formation of cracks between the edge of the core and the encapsulating material that have frequently appeared in prior art encapsulated motors. The cracks in the encapsulating material (usually an epoxy) at the edge of the core are caused by forces set up in the end turns of the windings during operation of the motor and by the differential expansion of the copper, iron and epoxy. The structure of this invention utilizing a resilient material such as an O-ring between the core coating 13 and the encapsulating material 21 has substantially eliminated the formation of cracks at this point and allows the manufacturer to use higher temperature compounds of epoxy resin for encapsulating the motor windings.

In manufacturing motor in accordance with this invention, the stator core is formed by stacking a series of laminations having winding slots formed therein. The slots are then aligned and the laminations are clamped together in an appropriate manner. The core is then coated with thermal reactive electrical insulating material. This can be done in any suitable manner but the best method known to us is to coat the core with the fluidized bed method described in U.S. Patent 2,844,489. In any event, the walls defining the winding slots and the end surfaces of the core 11 must be coated with a suitable insulating material to a sufficient thickness to prevent any short circuiting between the core and the windings. The windings 15 are then placed in the slot 12 and the end turns 17 are formed with the radius or curvature of the end turns beginning at the edge 18 of the core 11. Then if desired to further shorten the length of the motor, the assembled stator is placed in a fixture and the end turns are compressed toward the sides of the core. Then if desired the core is placed in a mold and the entire winding 15 is encapsulated in a suitable thermoreactive material.

Although but two embodiments of this invention have been illustrated and described, it will be apparent to those skilled in the art that various changes and modifications can be made therein without departing from the spirit of the invention or the scope of the appended claims.

Having now particularly described and ascertained the nature of our said invention and the manner in which it is to be performed, we declare that what we claim is:

A member for a dynamoelectric machine comprising a core having end surfaces and wall surfaces defining a plurality of arcuately spaced winding slots therein, said end surfaces and slot defining wall surfaces being coated with a first thermoreactive electric insulating material, windings positioned in said slots in direct contact with said insulating material, said insulating material completely separating said windings from said core, the portion of said windings extending beyond the end of said core being formed into loops, the curvature of said loops beginning abruptly at the edge of said core in compressive engagement with the portion of said insulating material covering the junction of said end walls and said slot defining wall surfaces, said loops being bent toward said core, said windings being encapsulated in a different thermoreactive material, resilient sealing material interposed between said first thermoreactive material and said encapsulating material and being radially spaced outward from said windings.

References Cited by the Examiner
UNITED STATES PATENTS

| | | | |
|---|---|---|---|
| 1,925,892 | 9/33 | Apple | 310—43 |
| 2,371,193 | 3/45 | Sigmund et al. | 310—43 |
| 2,383,019 | 8/45 | Sigmund | 310—43 |
| 2,548,133 | 4/51 | Treat | 310—43 |
| 2,772,046 | 11/56 | Shomphe | 310—43 |
| 2,814,744 | 11/57 | Demetriou et al. | 310—43 |
| 2,922,902 | 1/60 | Hargreaves | 310—45 |
| 2,961,555 | 11/60 | Towne | 310—43 |
| 2,967,959 | 1/61 | Waters | 310—43 X |
| 3,030,528 | 4/62 | DeJean | 310—45 |

MILTON O. HIRSHFIELD, *Primary Examiner.*
ORIS L. RADER, *Examiner.*